(12) United States Patent
Rakib et al.

(10) Patent No.: US 8,170,392 B2
(45) Date of Patent: May 1, 2012

(54) METHOD AND APPARATUS FOR GENERATION, DISTRIBUTION AND DISPLAY OF INTERACTIVE VIDEO CONTENT

(76) Inventors: Shlomo Selim Rakib, Cupertino, CA (US); Alexander Bronstein, San Jose, CA (US); Michael Bronstein, Santa Clara, CA (US); Gilles Bruno Marie Devictor, Milpitas, CA (US)

( * ) Notice: Subject to any disclaimer, the term of this patent is extended or adjusted under 35 U.S.C. 154(b) by 1128 days.

(21) Appl. No.: 11/944,290

(22) Filed: Nov. 21, 2007

(65) Prior Publication Data

US 2009/0129755 A1    May 21, 2009

(51) Int. Cl.
*H04N 5/765* (2006.01)
(52) U.S. Cl. ....................................... 386/124
(58) Field of Classification Search .................... 386/124
See application file for complete search history.

(56) References Cited

U.S. PATENT DOCUMENTS

| | | | |
|---|---|---|---|
| 6,006,265 A | 12/1999 | Rangan et al. | |
| 6,154,771 A | 11/2000 | Rangan et al. | |
| 6,570,587 B1 | 5/2003 | Efrat et al. | |
| 2003/0145333 A1 | 7/2003 | Hjelsvold et al. | |
| 2007/0044010 A1* | 2/2007 | Sull et al. ................... | 715/500.1 |

FOREIGN PATENT DOCUMENTS

| | | | |
|---|---|---|---|
| WO | WO 9910822 A1 | 3/1999 |
| WO | WO 0124052 A2 | 4/2001 |

\* cited by examiner

*Primary Examiner* — Kambiz Zand
*Assistant Examiner* — Stephen Sanders
(74) *Attorney, Agent, or Firm* — Stephen E. Zweig

(57) ABSTRACT

Proposed is a model for generation and use of metadata for interactive video navigation and video content identification.

49 Claims, 7 Drawing Sheets

Hypervideo, or hyperlinked video, is a displayed video stream that contains embedded, user clickable anchors, allowing navigation between video and other hypermedia elements.

```
Hypervideo, or hyperlinked              30(1)
<a href="Document2">video</a>,
is a displayed video stream that contains
embedded, user clickable anchors, allowing
navigation between video and other
<a href="Document3">hypermedia</a>
elements.                              30(2)
```

Figure 3

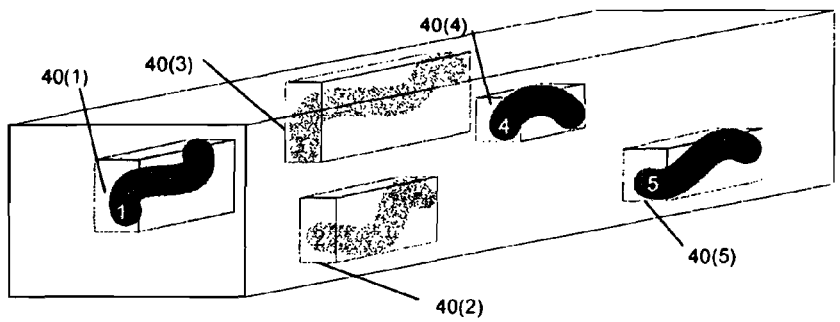

| Element | Corner1 | Corner2 |
|---|---|---|
| 1 | 10,20,5 | 15,70,15 |
| 2 | 80,70,20 | 90,90,40 |
| 3 | 40,5,20 | 50,20,50 |
| 4 | 20,30,60 | 30,40,70 |
| 5 | 80,70,75 | 90,80,90 |

Part of video map

| Element | ID | Description | Clickable | Action |
|---|---|---|---|---|
| 1 | 000001 | BMW car | Yes | Video4 |
| 2 | 000002 | James Bond | No | N/A |
| 3 | 000003 | Ferrari car | No | N/A |
| 4 | 000004 | Suitcase | Yes | Document3 |
| 5 | 000005 | Pen | Yes | Video3 |

Metadata

Figure 4

METHOD AND APPARATUS FOR GENERATION, DISTRIBUTION AND DISPLAY OF INTERACTIVE VIDEO CONTENT

FIELD OF THE INVENTION

The present invention is directed to a method and apparatus for initiating action based upon dual detection at a client and a server of features in a spatial-temporal location of a video and computation of signatures associated therewith.

BACKGROUND OF THE RELATED ART

Hypervideo, or hyperlinked video, is a generic name of video content that contains embedded, user clickable anchors, allowing navigation between video and other hypermedia elements. Hypervideo is thus analogous to hypertext, a concept widely used in the World Wide Web, which allows to click on a word in one document and retrieve information from another document.

The concept dates back to the late 1980s, with its adoption being very slow. Today, with a wider availability of broadband internet and the rise of YouTube-type of services, the consumption model of video content is rapidly changing. It is expected that internet-based video distribution in the form of download or streaming will replace the traditional media distribution like DVD or TV.

As the amount of video content increases and becomes available on the Internet, the need for navigation in such content becomes more important. Hypervideo is believed to be a convenient answer that will revolutionize the consumption of video in the same way as hypertext did with textual media.

Finally, the most significant value of hypervideo is in commercial advertising. So far, devising a business model to monetize video has proven notoriously difficult. The application of traditional advertising methods used on the TV, like for example introducing ads into video, is regarded very unfavorably by the online community. Hypervideo offers an alternate way to monetize video, allowing for the possibility of creating video clips where objects link to advertising or e-commerce sites, or provide more information about particular products. This new model of advertising is less intrusive, only displaying advertising information "on demand" when the user makes the choice by clicking on an object in a video. And since it is the user who has requested the product information, this type of advertising is better targeted and likely to be more effective.

SUMMARY OF THE INVENTION

The present invention is directed to a method and apparatus for initiating action based upon dual detection at a client and a server of features in a spatial-temporal location of a video and computation of signatures associated therewith.

In one aspect, the present invention provides a method of operating upon a video stream, the method of, at a user processing system, receiving a segment of the video stream, the video stream including video information for representing sequential frames, the video information including video data used substantially only for rendering sequential frame images; receiving a request for an action corresponding to a spatial-temporal location of displayed images located within the segment of the video stream; automatically detecting features in a vicinity of the spatial-temporal region of the segment of the video stream, the step of automatically detecting the features within the segment of the video stream operating upon the video data that is used for rendering the sequential frame images; obtaining a representation map of various regions of the video stream based upon the detected features; computing an electronic signature based upon the request and the representation map; and using the electronic signature to initiate performance of the action.

In another aspect, the present invention provides a method of operating upon a video stream that includes sequential frames, such that, at a first computing location, receiving the video stream, the video stream including video information for representing sequential frames, the video information including video data used substantially only for rendering sequential frame images; obtaining a representation map that represents regions within the video stream, including: automatically detecting features within the video stream, the step of automatically detecting the features within the video stream operating upon the video data that is used for rendering the sequential frame images; and computing electronic signatures for different ones of the various regions, respectively, based upon the detected features; and identifying an action to associate with each electronic signature. In a further related aspect, there can follow at a second computing location that is the same or different from the first computing location receiving a client electronic signature; matching the client electronic signature with a particular one of the electronic signatures from the representation map; identifying the action associated with the particular one of the electronic signatures; and initiating the action.

In a further aspect of the invention, there is provided a method of operating upon a video stream in which, at each of a user processing system and a server processing system that are physically separated: receiving the video stream, the video stream including video information for representing sequential frames, the video information including video data used substantially only for rendering sequential frame images; obtaining a representation map that represents regions within the video stream, including: automatically detecting features within the video stream, the step of automatically detecting the features within the video stream operating upon the video data that is used for rendering the sequential frame images; and computing electronic signatures for different ones of the various regions, respectively, based upon the detected features; and, wherein: one of the electronic signatures computed at the user processing system is transmitted to the server processing system; the one electronic signature is compared to the electronic signatures computed at the server processing system to determine which particular electronic signature computed at the server processing system is a match to the one electronic signature; and based upon the match, the server processing system initiates an action.

In the above aspects, obtaining the representation map can occur by obtaining implicit objects as the regions based upon the detected features or obtaining video elements as the regions based upon the detected features.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein:

FIG. 3 illustrates an example of hypertext in HTML format, with metadata embedded into the content.

FIG. 4 illustrates an example of hypervideo according to the present invention, with the metadata separate from the content.

DETAILED DESCRIPTION OF THE PREFERRED EMBODIMENTS

Representation of Hypervideo
Video Elements

Figure 1:
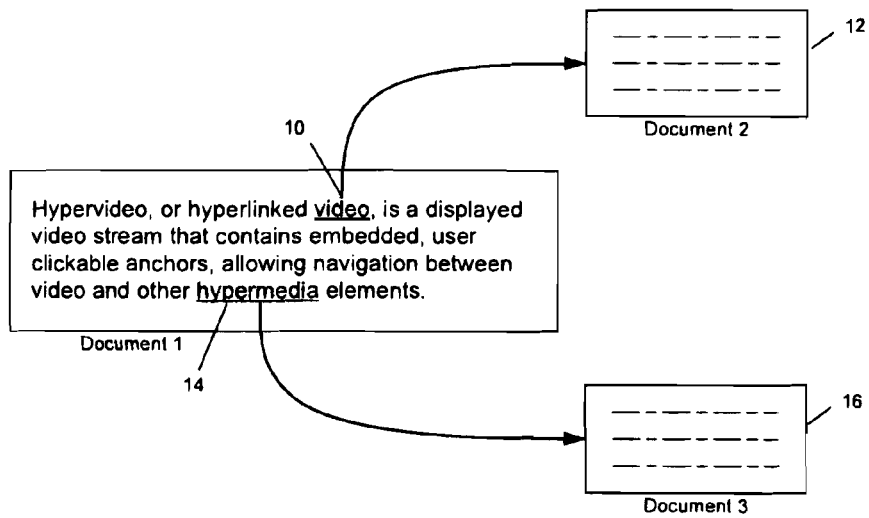
FIG. 1 illustrates a conceptual visualization of hypertext, as seen today in most web applications.

Using the example of hypertext, in broad terms, hypertext is a linear sequence of symbols (the characters within "document 1", some of which (10, 14) have associated metadata (12, 16) pointing to other media content (hyperlink, FIG. 1).

Figure 2:
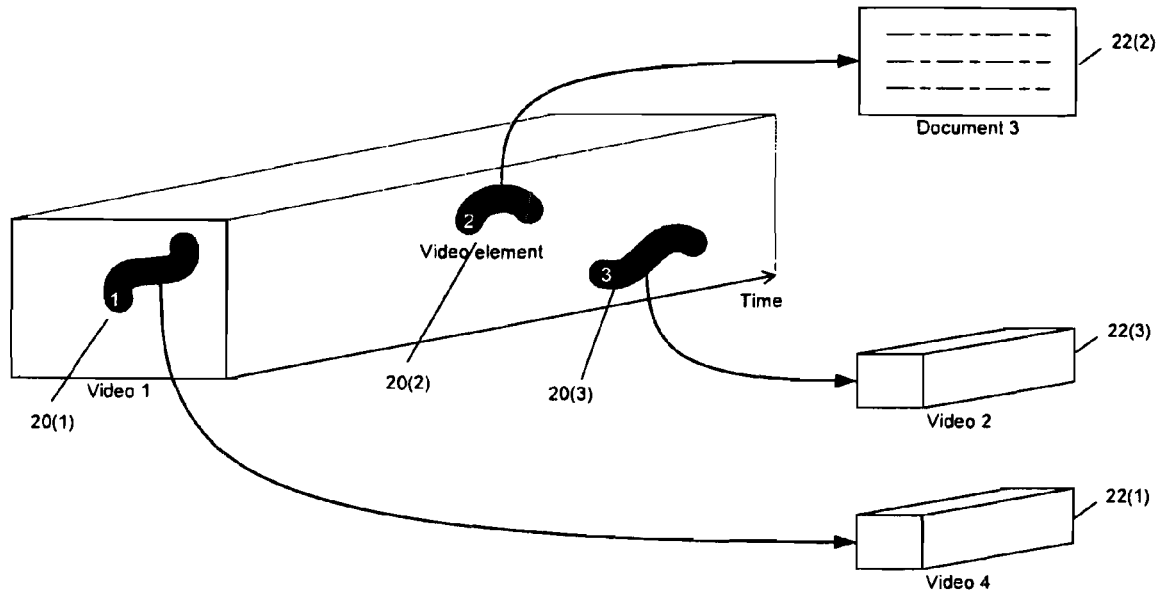
FIG. 2 illustrates a conceptual visualization of hypervideo.

Applying this analogy to video, we can consider video as a three-dimensional spatio-temporal array of pixels representing the visual information that is changing in time, such that contiguous regions in this array correspond to a visually meaningful object. Associating metadata (shown as 22(1), 22(2) and 22(3) in FIG. 2 with a video object creates a hyper-object. In general, such "objects" in video are not necessarily semantically meaningful—a consistent region of pixels does not have to have a visual interpretation. Therefore, in order to avoid semantic connotation, we use the term video elements (or explicit objects), referring to such regions of pixels, shown as video elements 20 in FIG. 2, and specifically video elements 20(1), 20(2) and 20(3). Video elements are also described in U.S. patent application Ser. No. 11/778,633 entitled "Method and Apparatus for Video Digest Generation" filed on Jul. 16, 2007, the contents of which are expressly incorporated herein by reference.

The representation of metadata in hypertext and hypervideo is different. In Hypertext markup language (HTML), one of the most widely used syntaxes to describe hypertext, the metadata link 30 is embedded into the content itself. The metadata identifies the object and associates an action with it. For example, as shown in FIG. 3, an action can be opening another document (shown as metadata link 30(1)) or a media file (shown as metadata link or hyper-reference 30(2)), or more generally, performing any operation on the client.

One of the possible ways to represent the metadata is as a list of actions associated with the corresponding video elements, as shown in FIG. 4. The list may contain the element ID, keywords describing it, a flag indicating whether it is clickable or not and an associated action. In a more generic case, the metadata may contain a list of possible actions associated with each video element, out of which one specific action is selected, for example, using personal information from the user profile.

In the representation of hypervideo suggested here, the metadata is stored separately and points to a video map, a hierarchical data structure described in the following sections. The video map, in turn contains some description on the spatio-temporal locations of the video elements in the video. The actual syntax of this description depends on the desired compactness and accuracy of representation. For example, the easiest way to represent video elements is by specifying the corners of their spatio-temporal bounding boxes (shown as 40(1)-40(5) in FIG. 4, with corner locations shown by the identifier "part of the video map." Shown in FIG. 4 is a description in the video map in which video elements 40 are represented as bounding boxes.

For the following discussion it is important to distinguish between the video map that allows to identify the clickable objects and the metadata, which describes the action associated with clicking such an object. In the representation of hypervideo according to the present invention, these two data structures are separate.

Video Features

At a level of granularity below video elements in the video map we have video features, in the following referred to simply as "features". A feature is a generic term in computer vision, usually described as a vector of information associated with a spatio-temporal subset of the video. For example, a feature can be the 3D direction of a spatio-temporal edge, local direction of the motion field, color distribution, etc.

Figure 5:
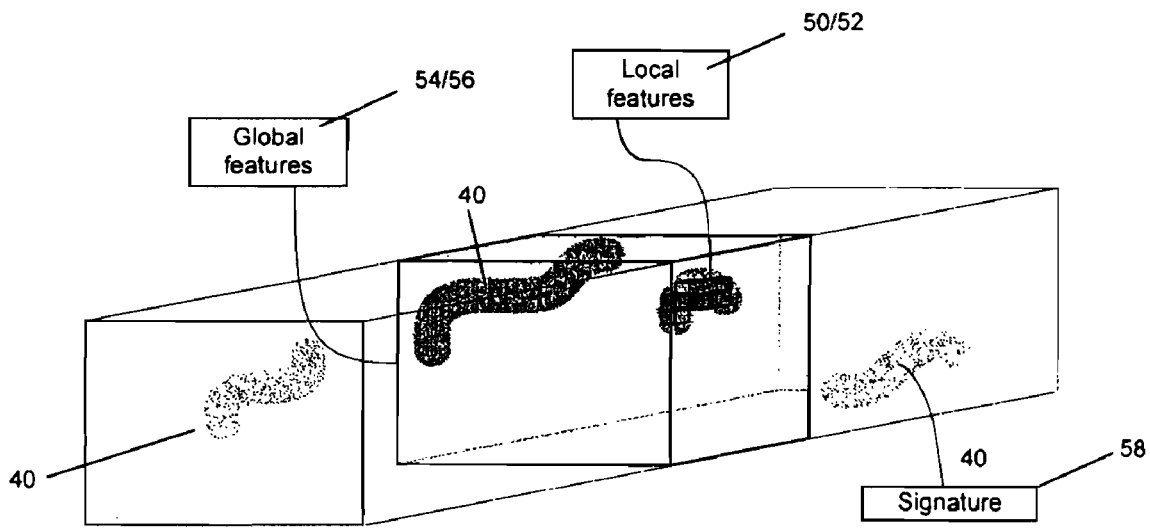
FIG. 5 illustrates a data hierarchy of a video map according to the present invention

Here, as shown in FIG. 5, we distinguish between local features 50, associated with a spatio-temporal location (in the highest level of granularity, a single pixel 52) and global features 54, associated with larger spatio-temporal units (frames, shots or scenes 56). Typically, local features provide a description of the object, and global features provide the context. For example, an apple object in a computer advertisement and an apple object in a shot of fruits will probably have the same local features describing the object, but the global context will be different.

More broadly, we can say that local features refer to sub-frame-level structures, and global features refer to sequence-level structures.

Audio Features

When referring to "video", one can also, preferably but not necessarily, consider the audio component (soundtrack) which is, in most cases, part of the video. Audio data also contains important information allowing one to identify parts of objects of interest.

Since the audio data is one-dimensional, it provides information at the sequence level. Audio features can thus be considered as global features.

Signatures

Since a video object consists of a group of pixels, it will usually be associated with multiple local features of different types. Aggregating the local features 50 associated with a video element 40 and its context into a single vector, we obtain what is termed here as a signature 58. A signature 58 is a description of a video element 40, representing its properties and context, and is described in detail further hereinafter.

Audio features can also be part of the signatures 58.

Video Map

Video map is a hierarchical data structure representing information about the video.

The highest level of granularity contains a representation of the smallest data units considered (either separate pixels or small blocks of pixels) and the associated local features.

Next level of granularity contains a representation of video elements and the associated signatures.

Next level of granularity contains a representation of higher-level data units such as shots and scenes and the associated global features, optionally audio features, as well as additional information (e.g. subtitles, etc.)

The lowest level of granularity may contain information about the entire video, such as genre, name, release year, information about actors and director, etc.

The video map serves as a unique identifier ("barcode" or "fingerprint") of the video. Of particular importance is the spatio-temporal structure of video elements and their signatures. Another instance of the same video, even undergoing certain editing or alteration, will have a similar distribution of objects, and will thus have a similar fingerprint.

The video map can be represented as a sequence of generalized "symbols", where a symbol is vector of values.

Implicit Objects

The video map may contain only partial information, i.e. have parts of the described above data structures missing or incomplete. As an important particular case considered here under the name implicit objects, there are no video elements 40, as they are absent and not generated The video map contains only features (local features 50 and global features 54), but no explicit indications of an area corresponding to an "object" in the video.

In such a case, a signature 58 can still be created by aggregating local features 50 in a spatio-temporal neighborhood of a point in a video together with global features 54 describing the context. Thus, potentially, we can associate a signature with each pixel, computed by aggregating features around it.

Figure 11:
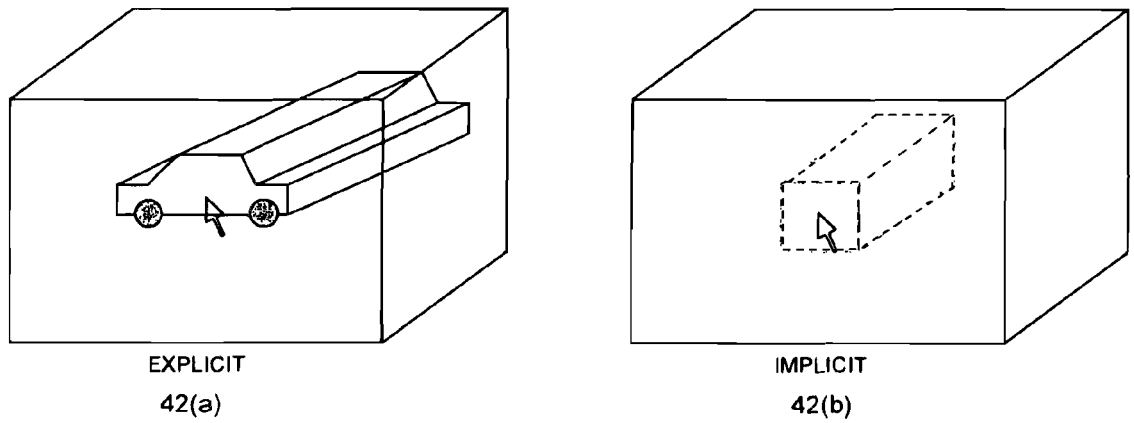
FIG. 11 illustrates an example of explicit and implicit objects according to the present invention.

FIG. 11 illustrates graphically an exemplary difference between an implicit object 42(*b*) and an explicit object 42(*a*).

Hypervideo Content Generation and Distribution

Figure 6:
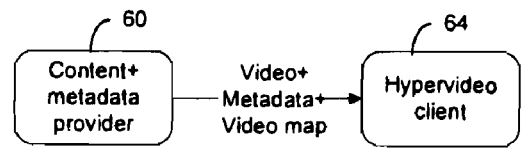
FIG. 6 illustrates a scheme of a conventional hypervideo content distribution.

A conventional hypervideo content distribution system consists of two main components as shown in FIG. 6: the content provider 60 and the front-end user application 64 (hypervideo client).

In a conventional hypervideo distribution model the content provider 60 provides not only the video, but also the metadata. The metadata is part of the video stream. One of the disadvantages of such a scheme is that the content provider 60 must be hypervideo-compatible, that is, all the content must be processed appropriately and converted into a format compatible with a hypervideo client 62. Specifically in the above example, the content provider 60 streams the video, the video map and the metadata to the client 62.

Figure 7:
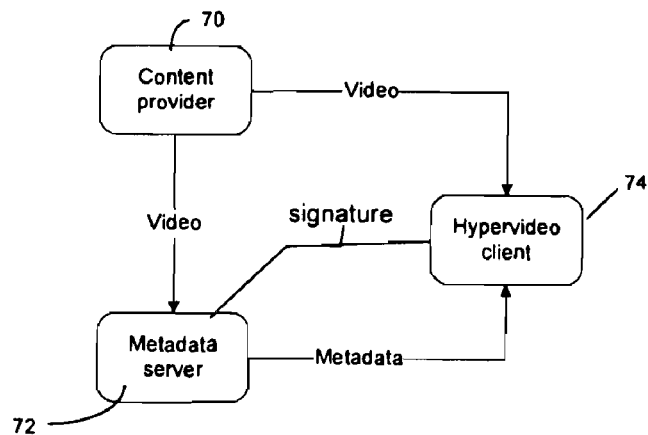
FIG. 7 illustrates a scheme of hypervideo content distribution according to the present invention.

According to the present invention, a scheme is described herein of hypervideo distribution that is independent of the content provider. According to this scheme, only the video information, which includes video data and audio data, is streamed from a content provider 70 to a hypervideo client 74, as shown in FIG. 7. Thus, the content provider 70 is agnostic to hypervideo and may use legacy content which contains no metadata or any additional information. For example, such a content provider 70 can be today's YouTube. The key idea is that the client 74 and a metadata server 72 use the same process to independently generate two video maps for the same video content. The following cases are possible:

the content on the client and the server side is identical and, as a result, the maps are identical.

the content on the client and the server side is similar and differs due to editing; the maps are similar.

the content on the client is a subset of the content on the server; the client map is partially similar to the server map.

The metadata server 72 then streams the metadata only, which, combined with the video from the content provider 70 and the video map generated on the client 74 form hypervideo content.

Hypervideo Distribution

In one embodiment of hypervideo distribution, each video has a unique ID, which is sent together with the video by the content provider 70 (such is, for example, the case of YouTube). This ID is sent by the hypervideo client 74 to the metadata server 72 in order to retrieve the correct metadata corresponding to the video. Alternatively, the same video content can be streamed simultaneously to the hypervideo client 74 and the metadata server 72, having both of them generate the video map simultaneously in real time.

Figure 8:
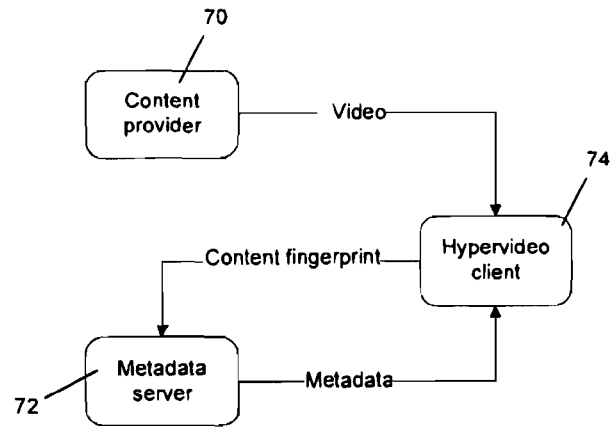
FIG. 8 illustrates a scheme of hypervideo distribution with content identification according to the present invention.

In a different embodiment shown in FIG. 8, the video content streamed by the content provider 70 can be identified at the hypervideo client side according to its signature 58. This signature 58 will be passed to the metadata server 74, which will stream the corresponding metadata. This can be useful to cope with illegally copied content: even a copy will still be identified correctly (even being modified or transcoded), and the hypervideo capabilities will be still used. For example, this may force the user to watch advertisements even in an illegal video.

Metadata Generation

Figure 9:
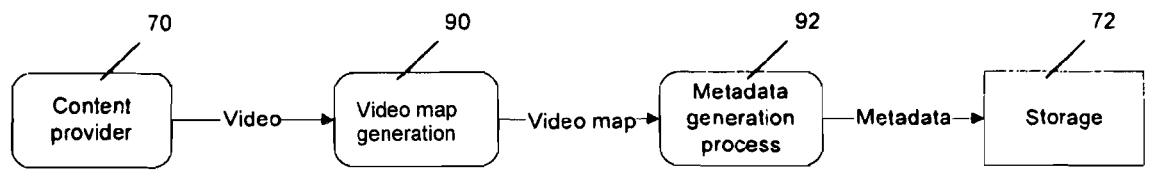
FIG. 9 illustrates a metadata generation stage at a metadata server side according to the present invention.

FIG. 9 illustrates the process of generating the metadata the metadata server 72, typically in an offline manner. For a given video obtained from a content provider 70, first the video map is generated as shown in step 90, then each of the video elements 40 in the map is annotated to link metadata as shown in step 92. The annotation process can be hierarchical and include automatic, manual or a combination of automatic and manual annotation. The metadata associated with the video is stored on the metadata server 72.

The metadata can be generated only partially and augmented during the viewing stage according to some personal profile. For example, some of the hyperlinks can be disabled (e.g. if the user is not interested in cars, video elements 1 and 3 in the example in FIG. 4 will not be clickable or lead to alternative favorable targets).

As another example, one could consider a personalized scheme of metadata creation. In this scheme, the generated metadata is incomplete and completed according to the user profile. For example, a BMW car video element will be linked not to the global website of BMW but rather to a local dealer, according to the user location.

It is possible to create an associative metadata dictionary, e.g. by majority vote. For example, if the majority of people clicking a car end up at the James Bond website, the car can be directly associated with James Bond.

The metadata can be produced using similarity criteria between video elements in a completely automatic manner. In this case, a video element may be linked to another element or elements in the same or other videos, which are the most similar (in some sense) to the current one.

An additional process which can be carried out together with video map generation is signature 58 generation, mentioned previously and described further hereinafter.

For any video map, more than one metadata might be associated to each video element. For example, if we look at the BMW example, several car dealers may create their own metadata for the BMW. All of them can be part of the metadata set. Different decision method might be used to determine which set of metadata will be used to perform an action.

Example of decision making items could be auction, action requester location, action request time, etc.

The content used by the metadata creator also does not need to be an exact copy of the content used to create the metadata that corresponds to the signatures on the map of the metadata server, as it can be a scaled or an edited version. An example would be a movie content. On the content server 70, the movie master might be used to create the map. The metadata creator could use, for example, a DVD or any other version of the movie when determining the metadata to use when creating metadata for the map.

Hypervideo Client

Figure 10:
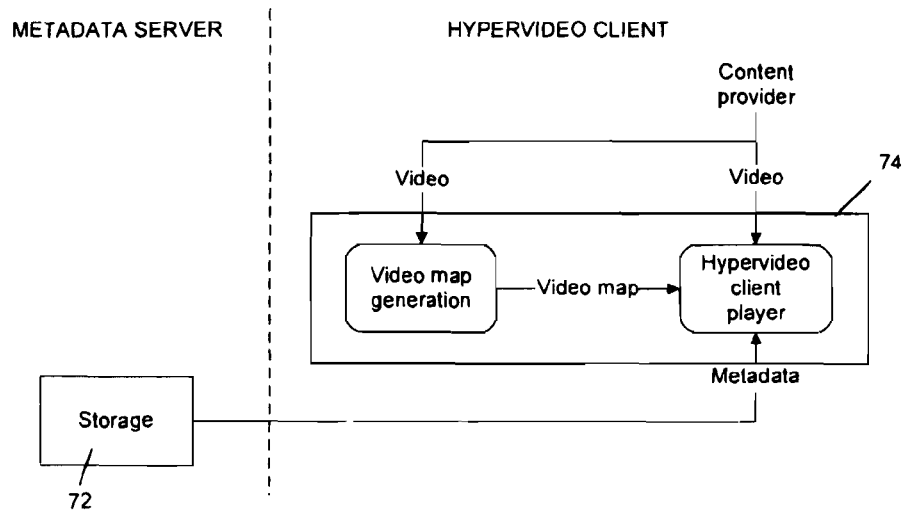
FIG. 10 illustrates a content viewing stage at metadata server and client sides according to the present invention.

On the client 74, the video map is generated in real time during the viewing of the video. An identical (or, in general case, a similar) video map is available on the metadata server 72, either from storage or generated in real time. In the most common use case, the user will click a location of interest in the displayed video. The user interface will provide the spatio-temporal coordinates of the clicked point, and referring to the video map, will identify the video element 40 corresponding to these coordinates. The signature 58 of the video elements 40 will be used to retrieve the associated action from the metadata server 72. Since the metadata server 72 has an identical video map to the one created on the client 74, it can provide only the metadata, which is then used by the client 74 to perform the desired action, as shown in FIG. 10.

Unlike the video map which may be a significant amount of information, the metadata could be compactly described, and in the simplest case be just the hyperlink associated with selected video elements.

If implicit objects are used, the video map created on the hypervideo client 74 does not contain description of the video elements 40. Thus, the signature 58 is associated with a clicked spatio-temporal location rather than with an object.

The content used to create the map on the client 74 does not need to be an exact copy of the content used to create the map on the metadata server 72. It can be a scaled or an edited version.

An example is movie content. On the metadata server 72, the movie master might be used to create the map. On the client 74, a broadcasted, a DVD or any other version of the movie might be used to create the map. In the case that other content such as advertisements have been mixed with the original movie, the algorithm in the metadata server 72 will be able to separate the movie signatures from the inserted advertisement signature and perform a match. In the case that some content has been removed from the movie (for rating purpose, for example), the metadata server 74 will be able to do a match between the remaining part of the movie signatures.

User Interface

The user interface of the hypervideo client provides the following three main functions: displaying the video, providing the user selecting a point of interest in the video, and performing the action associated with this selection. Using analogy of hypertext, the hypervideo client user interface has similarity to a web-browser.

Figure 12:
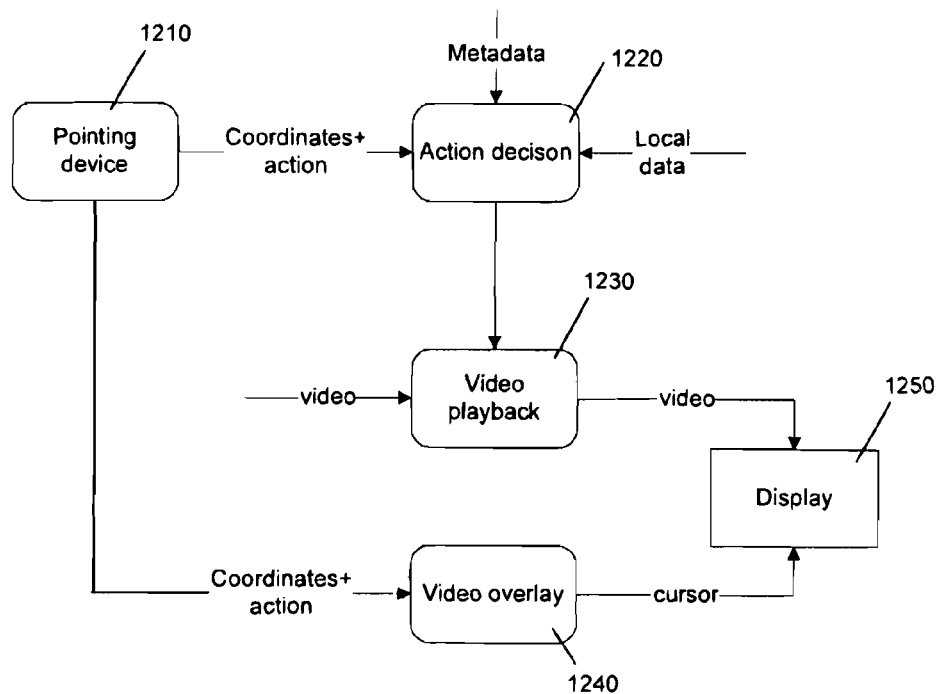
FIG. 12 illustrates a block diagram of one version of a client interface of the hypervideo client according to the present invention.

A schematic description of the main components of the user interface is shown in FIG. 12.

Pointing Device

Selection of the point of interest in the video is performed by means of a pointing device 1210. The pointing device 1210 allows inputting the position of a point of interest in the video and indicating the wish to initiate a desired action 1220, hereinafter referred to (by analogy with web-browsing) as click, which action can initiate, for example, video playback shown as action 1230, or alternatively, a video overlay shown as action 1240, either of which actions can then be used to allow a display 1250 of the result.

The spatial coordinates at which the device is currently pointing together with the moment at which the click is performed constitute the spatio-temporal location provided by the pointing device.

Figure 13A:
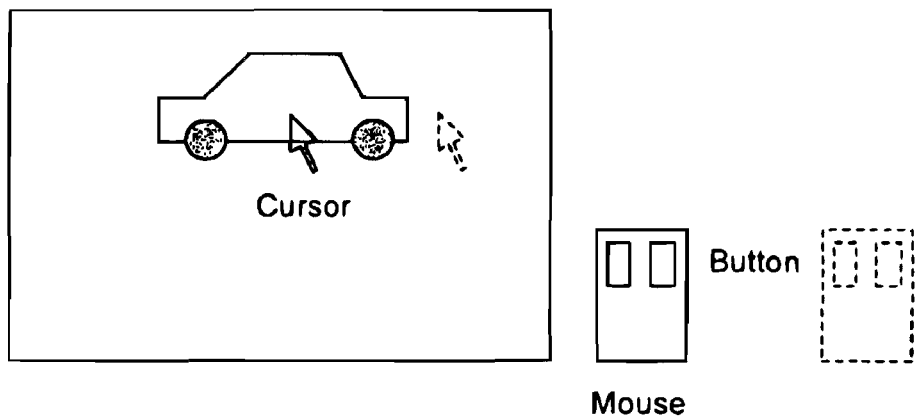
FIGS. 13(a), (b) and (c) illustrate different pointing devices used by the hypervideo client according to the present invention.
Figure 13B:
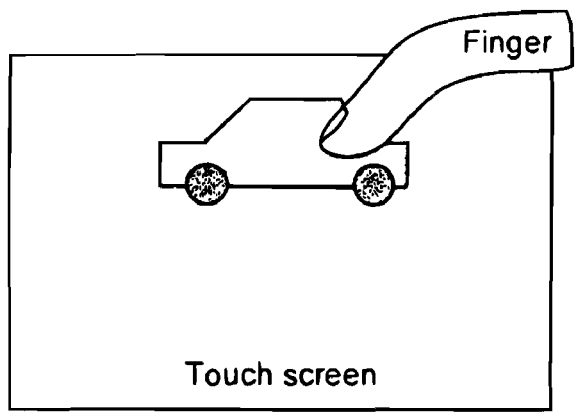
Figure 13C:
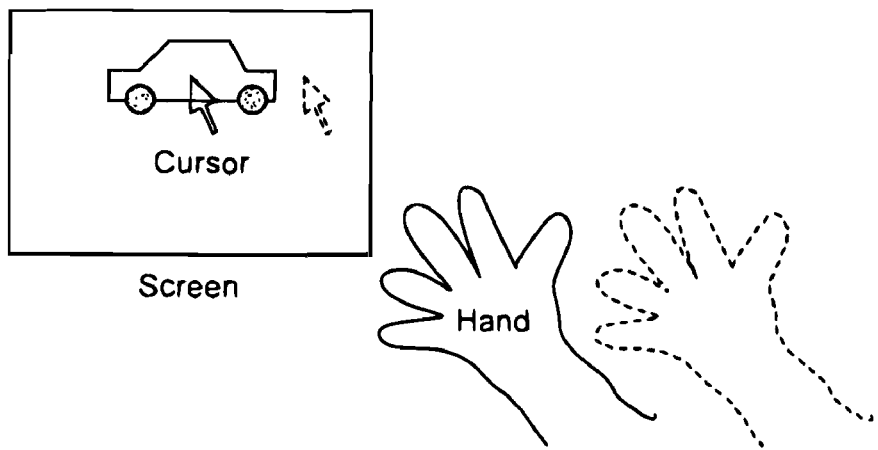
Figure 14:
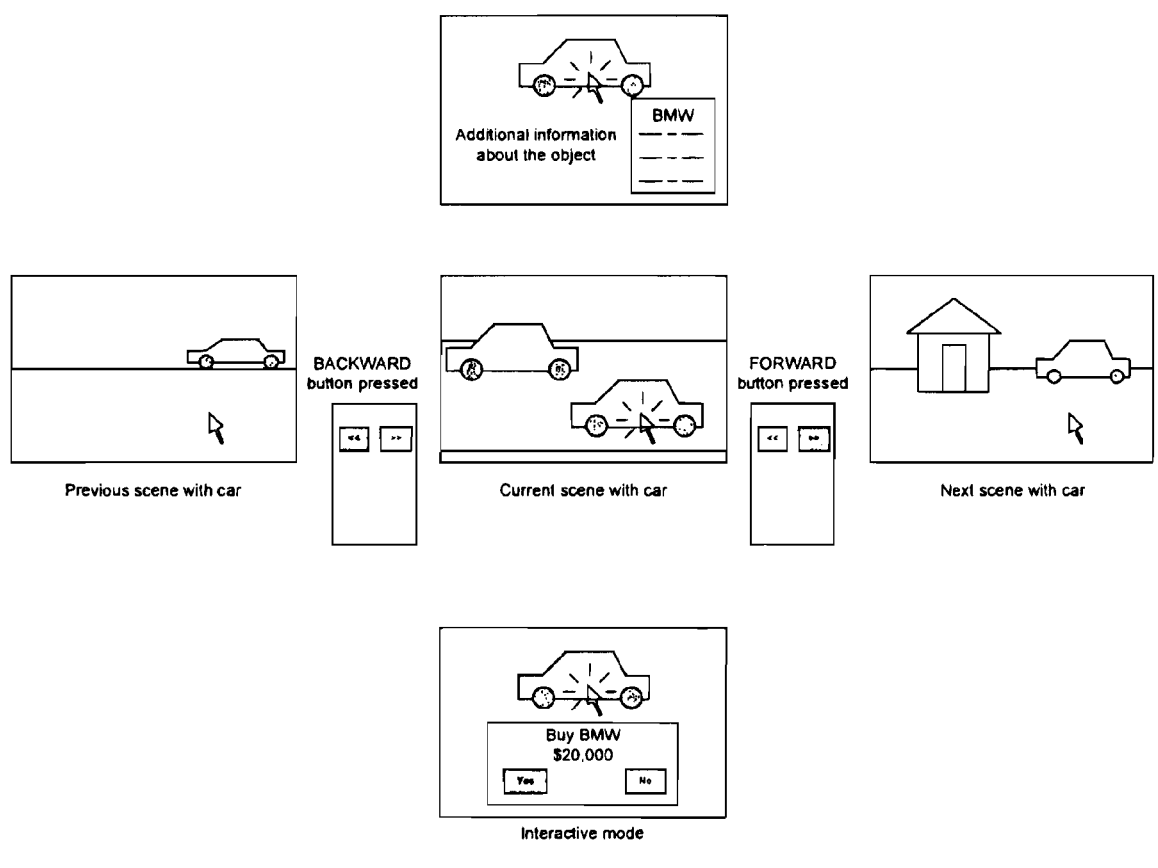
FIG. 14 illustrates examples of different types of action according to the present invention.

Specifically, we can distinguish between the following possible pointing devices, depending on the target application of the hypervideo client:

PC pointing devices: devices used for PC applications, such as mouse, trackball, touchpad, etc. Using these devices, a cursor is displayed on the screen at the current spatial coordinates. Moving the mouse (or trackball or touchpad) allows to displace the cursor to the desired position. Click is performed by pressing a button, as shown in FIG. 13(*a*).

Touch screen: touch screen is a display device sensitive to contact. The input of the location of interest is determined by touching a point on the screen. Such a pointing device is useful in mobile devices, as shown in FIG. 13(*b*).

Gesture recognition: The input of the location of interest is determined by performing a motion of the hand, and click is performed by means of a specific gesture. Such a pointing device is useful in TV-like applications. A variation of gesture recognition may involve pointing with an object, which in turn, can be an active device with buttons (e.g., TV remote control).

Actions

Upon clicking a location of interest, an action may be invoked. The specific type of action is determined by a decision process performed on the client, using the metadata provided by the server.

Broadly, we can distinguish between the following categories of actions:

Link: similarly to hypertext usage, the action performed after a click involves displaying the hyper-reference associated with the video element that corresponds to that location. The reference will typically be a media object such as text, webpage, audio or video file. Upon the click, the display of the current video will be terminated or paused, and the media object will be displayed. Alternatively, the associated content will be displayed as an overlay without interrupting the video playback. For example, upon clicking a location, related information describing the associated video element will be displayed. In another case, clicking a location will start the playback of another video in which the same or the most similar video element appears.

Navigation: a way to explore the current video. Upon clicking a location, the video will be displayed from the position, related in some way to the associated video element. In case of a pointing device with multiple buttons (mouse, remote), the action may depend not only on the location but also on the pressed button. For example, pointing to an actor's face in the currently displayed video and pressing the FORWARD button on the pointing device, the video will be fast-forwarded to the next scene involving the selected actor. Doing the same but pressing the BACKWARD button will bring the video to the previous scene in which the selected actor appeared. In case of a pointing device with a single click (touch screen), the type of action may be determined by presenting a menu with the appropriate selection.

User profile based action selection: In the metadata server 72, more than one metadata might be associated with each signature 58. Different decision methods might be used to determine which set of metadata will be used to perform an action. One of the suggested method of deciding which action to take is to use a user profile. User profile elements might be sent by the user in conjunction with the signatures 58 or might be stored in the metadata server 72.

An example of user profile might include the following elements:
- User physical location
- Time of the request
- User age group
- User wealth group
- User language
- Previous request history
- web cookies on the PC For example, a BMW dealer in San Jose, Calif., might have a special sales on Labor Day and purchase the action associated to the BMW video element, but only for requests originating from that area the day before the event. Only user with a San Jose user profile will receive the purchased action after clicking on a location associated with the BMW video element. Other user profiles might receive no information or a different action.

Interactive mode: clicking a location will invoke an interaction between the user and the client. An example application can be e-commerce, where clicking a location invokes an interactive interface allowing the user to purchase an item associated with the video element of that location.

Video Map Generation

The main algorithmic core of the hypervideo client and the metadata server is the computation of the video map, upon which the process of metadata retrieval is based.

An important desired property of the video map is a hierarchical structure, allowing for partial spatio-temporal comparison. As hypothetical scenario, consider two versions of the same video on the metadata server 72 and the client 74, for which a video map is constructed. The videos may differ due to some alterations they might have undergone, including:
- Spatial transformations: resolution and aspect ration conversion, cropping, overlay of pixels, color transformations, noise.
- Temporal transformation: frame-rate conversion, insertion or removal of content.

At the metadata retrieval stage, portions of the corresponding video maps are compared, which implies that the video map structure and the comparison process must be substantially invariant or insensitive to the above transformations.

In one of the preferred embodiments, the video is streamed to the hypervideo client in a compressed format (e.g. using MPEG compression). The video stream undergoes decoding, which produces a sequence of frames, represented as a video data in the form of a three-dimensional array of pixels audio data, as well as additional encoding parameters associated with each frame that are available from the decoded video stream.

The pixels and the encoding parameters are used to create a map of local features 50. The local features 50 are associated with each spatio-temporal location in the three-dimensional array of pixels; the granularity can be of separate pixels, or preferably, larger data units, e.g. small spatio-temporal blocks of pixels. We refer to such blocks as spatio-temporal basic data units.

Many methods for feature detection and representation described in the computer vision literature can be used. For example, local features 50 may include:
- Harris corner detector and its variants described in C. Harris and M. Stephens. "*A combined corner and edge detector*", Proceedings of the 4th Alvey Vision Conference, 1988,
- Scale invariant feature transform (SIFT), described in D. G. Lowe, "Distinctive image features from scale-invariant keypoints," International Journal of Computer Vision, 2004;
- Motion vectors obtained by decoding the video stream;
- Direction of spatio-temporal edges;
- Distribution of color;
- Description of texture;
- Coefficients of decomposition of the pixels in some known dictionary, e.g. of wavelets, curvelets, etc.
- Specific objects known a priori.

At the next step, the video elements 40 are located. Video elements 40 can be found explicitly from the pixel values by performing a process of video segmentation. The video elements can be found by performing a separate process of segmentation, or, taking advantage of already computed features, or using the local features 50 computed at the previous step. The features, represented as vectors associated with spatio-temporal basic data units, undergo vector quantization or clustering, which determines spatio-temporal regions with similar feature vectors. Any of existing vector techniques can be used; in one of the preferred embodiments, the Max-Lloyd method is used.

As a result, the three-dimensional array of pixels is segmented into regions. These regions go through a selection process, whose purpose is to prune insignificant regions (e.g. too small), merge similar regions and possibly select a predetermined number of regions. Each of the selected regions is labeled a video element 40 and its location is stored in a special data structure. The data structure allows, given a spatio-temporal location in the array of pixels, to determine the video element 40 it belongs to. In one of the preferred embodiments, the video elements locations are described as a three-dimensional map containing integer values, where a value x at a location corresponding to a basic data unit implies that this basic data unit belongs to video element number x. In another embodiment, the video elements 40 are described by the corner coordinates of their bounding boxes.

The feature vectors in the data units belonging to each video elements 40 are then aggregated. One of the possibilities to perform such aggregation is by means of coordinate-wise averaging of the vectors. The aggregated features are represented as a signature vector. In addition, description of the video element 40 such as its temporal duration or spatial size can be added to the signature vector. The signature vectors 58 are stored in a data structure and associated with the corresponding video elements 40.

The signatures 58 constitute a representation of local portions of the video, in a way which is insensitive to spatial transformations. If the modifications are not very significant, the signatures 58 of two versions of the video will be similar or identical.

The structures of features, video elements and signatures are referred to collectively as a video map.

During the operation of the hypervideo client 74, the video map is created in real time. In one of the preferred embodiments, the decoded video data (and, in further embodiments, audio data as well that are associated with the video data) is stored in a temporary buffer, on which the video map generation algorithm operates. The video is displayed with a delay of a few frames, sufficient to create the video map for at least a few frames in advance. Conventional hardware and software can be used for the hypervideo client, including general purpose computers with application software that is used to code the functions identified herein, embedded processors with application software that is used to code the functions identified herein, or ASICs with processors having hard-coded programming within or a combination of hard-coded programming and software applications, for example. Processors that can be used include general purpose microprocessors, microcontrollers, DSP's and application specific integrated circuit processors.

When the pointing device is used to click a location in the video, the spatial coordinates of the pointing device (or the cursor) together with the point in time when the click was performed are used to look up the corresponding video element 40 in the video map. If there exists a video element 40 at the requested location, its signature 58 is extracted from the video map (or in one of the preferred embodiments, generated on demand) and sent to the metadata server 72.

On the metadata server 72, the same process is used to generate the video map. The signature 58 is compared to a database of signatures, from which the closest one is selected. The associated metadata is sent to the client 74, on which the action resulting from the click is determined.

In the case of implicit objects, the stage of video elements generation is absent. Instead, the video map contains only the feature vectors. When the pointing device is used to click a location in the video, the spatial coordinates of the pointing device (or the cursor) together with the point in time when the click was performed are used to look up features in a spatio-temporal neighborhood of this spatio-temporal location (e.g. of predefined size). These features are then aggregated into a signature, which is sent to the metadata server 72.

Exemplary Algorithm for Video Map Generation

The following specific algorithm for video map generation is used in one of the preferred embodiment of the invention:

1. Input a set of subsequent frames from the video stream, each frame being represented as a two-dimensional array of pixels, and the set of frames represented as a three-dimensional (spatio-temporal) array of pixels. If the input stream is compressed, the frames are obtained as the result of a video decoding process.

2. Divide the three-dimension pixel array into small, possibly overlapping three-dimensional blocks of pixels (for example, 16×16×3). The blocks are numbered as $b_{ijk}$, where i, j are two spatial coordinates and k is the temporal coordinate (frame number). The blocks are represented as a three-dimensional array, in which each entry corresponds to a block.

3. For each of the blocks of pixel, compute M local features 50. In one of the embodiments of the invention, the features include:
average luma pixels intensity in the block;
average chroma pixels intensity in the block;
spatio-temporal gradient computed on the pixels in the block, representing the direction and strength of the local spatio-temporal edge;
if the stream is compressed, an additional input preferably is the average of the motion vectors in the block, where the motion vectors are additional parameter information present in the compressed stream.

For block $b_{ijk}$, each of the above features is represented as a vector $f^m_{ijk}$, where m is the feature number. All the features are concatenated into a single vector $f_{ijk}=(f^1_{ijk},\ldots,f^M_{ijk})$. The feature vectors are represented as a three-dimensional array, in which each entry corresponds to a feature associated with a block of pixels.

4. The feature vectors undergo clustering by means of a vector quantization algorithm. In one of the embodiments of the invention, Max-Lloyd algorithm, described in A. Gersho, R. M. Gray, Vector quantization and signal compression, is used. Vector quantization divides the three-dimensional array of pixels into regions with same or similar feature vectors.

The regions are typically represented as a block-wise map, in which each entry is the number of a region to which the block belongs.

5. The map of spatio-temporal regions undergoes morphological processing, which removes regions of spatial and temporal size below a pre-set threshold and merges disconnected regions with the same numbers. In one of the embodiments of the invention, a pre-set number of regions is given, and regions are merged or removed in such a way that the total number of remaining regions as a result of the processing equals the pre-set number.

6. The feature vectors in blocks belonging to the regions produced at stage 5 undergo aggregation, which produces a signature vector associated with each region. Context captured by global features and audio can be added to the signature vector.

In one of the embodiments of the invention, the signature 58 of a region has the dimensions of a feature vector and is produced by averaging the coordinates of the feature vectors in blocks belonging to that region.

In another embodiment, the aggregation is performed by computing the histogram of the feature vectors. The number of bins in the histogram is pre-set.

In another embodiment, the feature vectors in blocks belonging to the region undergo principal component analysis (PCA), producing a vector of pre-set size, composed of the largest components extracted by PCA, as described in K. Fukunaga, Introduction to Statistical Pattern Recognition, 1990.

Video Map Matching

The metadata server 72 is illustrated and described herein as a single computing location, though it should be understood, however, that the metadata server 72 can be distributed. In a particular embodiment, the video map generation can occur at one or more locations, depending upon the size of the generated video map, and the various portions can be integrated. Further, after an initial generation of the video map, the generated video map can be distributed to various different other locations, which other locations can serve to assist with determining whether a signature 58c received from a client 58 match to or essentially match to signatures 58s that are stored on the generated video map that was previously generated by the metadata server location(s). Updates to the generated video map at the metadata server 72 can be made at periodic or other intervals.

Also, updates to the functions used to produce the generated video map can also be introduced, though it is understood that the same updates at both metadata server 72 and client 74 locations are needed.

With respect to matching of the signatures, ideally, if the video content on the metadata server 72 and the client 74 is identical, the corresponding video maps would be identical, thus resulting in exact match. However, it is possible that the metadata server 72 and the client 74 versions of the video map result from different instances of the same video (for example, on the metadata server 72 the video map is created from a DVD version at 24 frames per second NTSC resolution, and on the client 74 the video map is created from a broadcast 30 frames per second HDTV resolution, with an insertion of advertisements), as well as variances for other reasons. In such cases, the matching is expected to be only approximate.

Further, the video on the client 74 may be new, such that the corresponding video map does not exist on the server 72. In such a case, the closest match will be used to retrieve the metadata.

The match is performed between a signature 58c sent by the client 74 (referred to as probe) and the signatures 58s in the video maps on the metadata server 72. The signatures 58c and 58s are compared as vectors, using some pre-defined metric. In the simplest case, the vectors are compared using the Euclidean metric, which is the sum of squared coordinate-wise differences between the vectors. The closest match is determined by comparing the probe signature to the signatures on the server, and selecting one with the smallest metric.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A method of operating upon a video stream, the method comprising the steps of:
    at a user processing system:
    receiving a segment of the video stream, the video stream including video information for representing sequential frames, the video information including video data used substantially only for rendering sequential frame images;
    receiving a request for an action corresponding to a spatial-temporal location of displayed images located within the segment of the video stream;
    automatically detecting features in a vicinity of the spatial-temporal region of the segment of the video stream, the step of automatically detecting the features within the segment of the video stream operating upon the video data that is used for rendering the sequential frame images;
    obtaining a representation map of various regions of the video stream based upon the detected features;
    computing an electronic signature based upon the request and the representation map by aggregating a plurality of said features wherein said features and said aggregation are chosen to produce an electronic signature that is insensitive to spatial transformations;
    and using the electronic signature to initiate performance of the action.

2. The method according to claim 1 wherein the request for action is an information request, and wherein the step of using the electronic signature includes the steps of:
    transmitting the electronic signature to an external server;
    receiving information in response to the transmitted electronic signature; and displaying the information.

3. The method according to claim 1 wherein the request for action is an information request, and wherein the step of using the electronic signature includes the steps of:
    performing a local request using the electronic signature to obtain information that is stored entirely within the user processing system; receiving the information in response to performing the local request;
    and displaying the information.

4. The method according to claim 1 wherein the request for action is a content action request, and wherein the step of using the electronic signature includes the step of performing initiates a process related to content within the segment of the video stream using the electronic signature.

5. The method according to claim 4 wherein the content action request is a request to skip, swap, or overlay content corresponding to the electronic signature.

6. The method according to claim 4 wherein the content action request is a request for an interactive session corresponding to the electronic signature, and wherein the step of computing the electronic signature requires an additional request.

7. The method according to claim 1 wherein the step of receiving the request includes at least one of receiving an input from a user controlled controller and receiving a text message from a user controlled device.

8. The method according to claim 1 wherein the video data operated upon in the step of detecting is uncompressed video data.

9. The method according to claim 8 wherein the uncompressed video data is pixel data.

10. The method according to claim 8 wherein the step of obtaining the representation map obtains implicit objects as the regions based upon the detected features, and wherein the step of computing the electronic signature computes the electronic signature based upon one of the implicit objects from the representation map that is associated with the request.

11. The method according to claim 8 wherein the step of obtaining the representation map obtains video elements as the regions based upon the detected features, and wherein the step of computing the electronic signature computes the electronic signature based upon one of the video elements from the representation map that is associated with the request.

12. The method according to claim 8 wherein the video information further includes supplemental video parameter information that is separate from the video data and wherein the step of detecting also operates upon the supplemental video parameter information.

13. The method according to claim 1 wherein the video information further includes supplemental video parameter information that is separate from the video data and wherein the step of detecting also operates upon the supplemental video parameter information.

14. The method according to claim 1 wherein the video information further includes audio data and wherein the step of detecting also operates upon the audio data.

15. The method according to claim 1 wherein the step of obtaining the representation map obtains implicit objects as the regions based upon the detected features, and wherein the step of computing the electronic signature computes the electronic signature based upon one of the implicit objects from the representation map that is associated with the request.

16. The method according to claim 1 wherein the step of obtaining the representation map obtains video elements as the regions based upon the detected features, and wherein the step of computing the electronic signature computes the electronic signature based upon one of the video elements from the representation map that is associated with the request.

17. The method according to claim 1 wherein the video data operated upon in the step of detecting is compressed video data.

18. The method according to claim 17 wherein the compressed frame data is motion vector data.

19. The method according to claim 17 wherein the video information further includes supplemental video parameter information that is separate from the video data and wherein the step of detecting also operates upon the supplemental video parameter information.

20. The method according to claim 17 wherein the step of obtaining the representation map obtains implicit objects as the regions based upon the detected features, and wherein the step of computing the electronic signature computes the electronic signature based upon one of the implicit objects from the representation map that is associated with the request.

21. The method according to claim 17 wherein the step of obtaining the representation map obtains video elements as the regions based upon the detected features, and wherein the step of computing the electronic signature computes the electronic signature based upon one of the video elements from the representation map that is associated with the request.

22. The method according to claim 17 wherein the video information further includes audio data and wherein the step of detecting also operates upon the audio data.

23. The method according to claim 1 wherein the step of receiving receives the segment of the video stream from one of a DVD disposed within the user processing system and broadcast content that is received from an external source.

24. The method according to claim 1 wherein the user processing system includes one of a microprocessor, a microcontroller, a DSP and an application specific integrated circuit processor.

25. A method of operating upon a video stream that includes sequential frames, the method comprising the steps of:
at a first computing location:
receiving the video stream, the video stream including video information for representing sequential frames, the video information including video data used substantially only for rendering sequential frame images;
obtaining a representation map that represents regions within the video stream, including:
automatically detecting features within the video stream, the step of automatically detecting the features within the video stream operating upon the video data that is used for rendering the sequential frame images;
and computing electronic signatures for different ones of the various regions, respectively, based upon the detected features by aggregating a plurality of said features wherein said features and said aggregation are chosen to produce an electronic signature that is insensitive to spatial transformations;
and identifying an action to associate with each electronic signature.

26. The method according to claim 25 further comprising the steps of:
at a second computing location that is the same or different from the first computing location:
receiving a client electronic signature;
matching the client electronic signature with a particular one of the electronic signatures from the representation map;
identifying the action associated with the particular one of the electronic signatures;
and initiating the action.

27. The method according to claim 26 wherein the step of identifying the action includes the step of associating a user profile with the particular signature so that one action is identified based upon the user profile and the particular signature.

28. The method according to claim 26 wherein the step of identifying the action includes the step of associating a monetary amount with the particular signature so that one action is identified based upon the monetary amount and the particular signature.

29. The method according to claim 26 wherein the particular signature from the step of matching is a closest electronic signature to the client electronic signature that exists within the representation map.

30. The method according to claim 29 wherein the closest signature that exists within the representation map is an identical signature.

31. The method according to claim 25 wherein the video data operated upon in the step of detecting is uncompressed video data.

32. The method according to claim 31 wherein the uncompressed video data is pixel data.

33. The method according to claim 31 wherein the step of obtaining the representation map obtains implicit objects as the regions based upon the detected features, and wherein the step of computing the electronic signatures computes the electronic signatures based upon the respective implicit objects.

34. The method according to claim 31 wherein the step of obtaining the representation map obtains video elements as the regions based upon the detected features, and wherein the step of computing the electronic signatures computes the electronic signatures based upon the respective video elements.

35. The method according to claim 31 wherein the video information further includes supplemental video parameter information that is separate from the video data and wherein the step of detecting also operates upon the supplemental video parameter information.

36. The method according to claim 35 wherein the video information further includes audio data and wherein the step of detecting also operates upon the audio data.

37. The method according to claim 25 wherein the video information further includes supplemental video parameter information that is separate from the video data and wherein the step of detecting also operates upon the supplemental video parameter information.

38. The method according to claim 25 wherein the video information further includes audio data and wherein the step of detecting also operates upon the audio data.

39. The method according to claim 25 wherein the step of obtaining the representation map obtains implicit objects as the regions based upon the detected features, and wherein the step of computing the electronic signatures computes the electronic signatures based upon the respective implicit objects.

40. The method according to claim 25 wherein the step of obtaining the representation map obtains video elements as the regions based upon the detected features, and wherein the step of computing the electronic signatures computes the electronic signatures based upon the respective video elements.

41. The method according to claim 25 wherein the video data operated upon in the step of detecting is compressed video data.

42. The method according to claim 41 wherein the compressed frame data is motion vector data.

43. The method according to claim 41 wherein the video information further includes supplemental video parameter information that is separate from the video data and wherein the step of detecting also operates upon the supplemental video parameter information.

44. The method according to claim 25 wherein the step of receiving receives the segment of the video stream from one of a DVD disposed within the user processing system and broadcast content that is received from an external source.

45. A method of operating upon a video stream, the method comprising the steps of:

at each of a user processing system and a server processing system that are physically separated:

receiving the video stream, the video stream including video information for representing sequential frames, the video information including video data used substantially only for rendering sequential frame images;

obtaining a representation map that represents regions within the video stream, including:

automatically detecting features within the video stream, the step of automatically detecting the features within the video stream operating upon the video data that is used for rendering the sequential frame images;

and computing electronic signatures for different ones of the various regions, respectively, based upon the detected features by aggregating a plurality of said features wherein said features and said aggregation are chosen to produce an electronic signature that is insensitive to spatial transformations;

and, wherein:

one of the electronic signatures computed at the user processing system is transmitted to the server processing system;

the one electronic signature is compared to the electronic signatures computed at the server processing system to determine which particular electronic signature computed at the server processing system is a match to the one electronic signature; and based upon the match, the server processing system initiates an action.

46. The method according to claim 45 wherein the electronic signatures obtained by each of the user processing system and the server processing system are substantially identical.

47. The method according to claim 1, wherein said features comprise one or more features selected from the group consisting of Harris corner detectors, Scale Invariant Feature Transform (SIFT), motion vectors, spatio-temporal edges, color distribution, texture description, and coeffecients of pixel decomposition in a defined dictionary of wavelets or curvelets, said features are represented as vectors, and said vectors undergo vector quantization or clustering to determine spatio-temporal regions with similar feature vectors.

48. The method according to claim 25, wherein said features comprise one or more features selected from the group consisting of Harris corner detectors, Scale Invariant Feature Transform (SIFT), motion vectors, spatio-temporal edges, color distribution, texture description, and coeffecients of pixel decomposition in a defined dictionary of wavelets or curvelets, said features are represented as vectors, and said vectors undergo vector quantization or clustering to determine spatio-temporal regions with similar feature vectors.

49. The method according to claim 45, wherein said features comprise one or more features selected from the group consisting of Harris corner detectors, Scale Invariant Feature Transform (SIFT), motion vectors, spatio-temporal edges, color distribution, texture description, and coeffecients of pixel decomposition in a defined dictionary of wavelets or curvelets, said features are represented as vectors, and said vectors undergo vector quantization or clustering to determine spatio-temporal regions with similar feature vectors.

* * * * *